US009350768B2

(12) United States Patent
Blomstrand et al.

(10) Patent No.: US 9,350,768 B2
(45) Date of Patent: May 24, 2016

(54) SUPPRESSING CAMEL SERVICE INVOCATION FOR DIVERTING USERS (75) Inventors: Jan Blomstrand, Segeltorp (SE); Mikael Forsberg, Tyreso (SE); Anders Jacobsson, Solna (SE); Armin Widegreen, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 95 days.

(21) Appl. No.: 14/348,570

(22) PCT Filed: Sep. 30, 2011

(86) PCT No.: PCT/EP2011/067174
§ 371 (c)(1),
(2), (4) Date: Mar. 28, 2014

(87) PCT Pub. No.: WO2013/044988
PCT Pub. Date: Apr. 4, 2013

(65) Prior Publication Data
US 2014/0226545 A1    Aug. 14, 2014

(51) Int. Cl.
H04L 29/06 (2006.01)
(52) U.S. Cl.
CPC ........ *H04L 65/1069* (2013.01); *H04L 65/1006* (2013.01); *H04L 65/1016* (2013.01); *H04L 65/1073* (2013.01); *H04L 65/1096* (2013.01)
(58) Field of Classification Search
CPC ............ H04L 65/1016; H04L 65/1096; H04L 65/1006; H04L 65/1069; H04L 65/1073
See application file for complete search history.

(56) References Cited

U.S. PATENT DOCUMENTS

| 2006/0046721 | A1* | 3/2006 | Sernan-Dez Arppe | H04M 3/10 455/435.2 |
| 2008/0268824 | A1* | 10/2008 | Allen | H04M 3/42059 455/415 |
| 2008/0291874 | A1* | 11/2008 | Bae | H04W 36/0022 370/331 |
| 2009/0073938 | A1* | 3/2009 | Zhu | H04M 7/123 370/331 |
| 2010/0195542 | A1* | 8/2010 | Li | H04M 7/123 370/271 |
| 2011/0090845 | A1* | 4/2011 | Bishop | H04L 65/1069 370/328 |
| 2011/0111734 | A1* | 5/2011 | Walker | H04L 67/306 455/414.1 |
| 2012/0163561 | A1* | 6/2012 | Zuo | H04W 4/22 379/46 |

FOREIGN PATENT DOCUMENTS

EP    2197237    6/2010

OTHER PUBLICATIONS

PCT Notification of Transmittal of the International Search Report and the Written Opinion of the International Searching Authority for PCT Counterpart Application No. PCT/EP2011/067174, (May 21, 2012), 12 pages.
"IP multimedia call control protocol based on Session Initiation Protocol (SIP) and Session Description Protocol (SDP); Stage 3", 3GPP TS 24.229 V11.0.0, *3rd Generation Partnership Project, Technical Specification Group Core Network and Terminals*, (Release 11), (Jun. 2011), 703 pages.

(Continued)

*Primary Examiner* — Brian D Nguyen
(74) *Attorney, Agent, or Firm* — Patent Portfolio Builders, PLLC (57) ABSTRACT A method is provided for establishing a new communication leg of a communication session in an IP Multimedia Subsystem, IMS, network architecture that includes CAMEL services. The method enables IMS network nodes to selectively invoke or suppress invocation of CAMEL services based on signaling received in SIP requests.

18 Claims, 5 Drawing Sheets (56) References Cited

OTHER PUBLICATIONS

"IP Multimedia Subsystem (IMS); Stage 2", 3GPP TS 23.228 V11.1.0, *3rd Generation Partnership Project, Technical Specification Group Services and System Aspects, IP Multimedia Subsystem (IMS)*, (Release 11), (Jun. 2011), 274 pages.

Cookson, et al., "3G service control", *BT Technology Journal*, vol. 19, No. 1, XP001006581, (Jan. 2001), pp. 67-79.

Crocker, et al., "Augmented BNF for Syntax Specifications: ABNF", *Network Working Group, Request for Comments: 5234*, (Jan. 2008), 16 pages.

Rosenberg, J., et al., "SIP: Session Initiation Protocol", *Network Working Group, Request for Comments: 3261*, (Jun. 2002), 269 pages.

Van Elburg, J., "The SIP P-Served-User Private-Header (P-Header) for the 3GPP IP Multimedia (IM) Core Network (CN) Subsystem", *Network Working Group, Request for Comments: 5502*, (Apr. 2009), 14 pages.

International Preliminary Report on Patentability, Application No. PCT/EP2011/067174, dated Apr. 10, 2014, 9 pages.

\* cited by examiner

SUPPRESSING CAMEL SERVICE INVOCATION FOR DIVERTING USERS

CROSS-REFERENCE TO RELATED APPLICATIONS

This application is a National stage of International Application No. PCT/EP2011/067174, filed Sep. 30, 2011, which is hereby incorporated by reference.

TECHNICAL FIELD

The present invention relates to a method for establishing a new communication leg of a communication session in an IP Multimedia Subsystem (IMS) network, where the IMS network architecture includes Customized Applications For Mobile Enhanced Logic (CAMEL) services. More particularly, it relates to the efficient use of information provided by the CAMEL services to one node of the IMS network, at other nodes of the IMS network.

BACKGROUND

IP Multimedia (IPMM) services provide a combination of voice, video, messaging, data, etc, within the same session. By growing the number of basic applications and the media which it is possible to combine, the number of services offered to the end users will grow, and the inter-personal communication experience will be enriched. This leads to a new generation of personalised, rich multimedia communication services, including so-called "combinational IP Multimedia" services.

IMS is the technology defined by the Third Generation Partnership Project (3GPP) to provide IP Multimedia services over mobile communication networks. IMS provides key features to enhance the end-user person-to-person communication experience through the integration and interaction of services. IMS allows new enhanced person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

Within an IMS network, Call Session Control Functions (CSCFs) perform processing and routing of signalling. CSCFs handle session establishment, modification and release of IP multimedia sessions using the SIP/SDP protocol suite. 3GPP TS23.228 describes the logical nodes P-CSCF, I-CSCF, S-CSCF, E-CSCF and BGCF. The S-CSCF conforms to 3GPP TS 24.229 and performs session control services for User Equipments (UEs). It maintains the session state to support the services, and performs the following functions:
- it acts as a registrar according to [RFC3261] at registration;
- it notifies subscribers about registration changes;
- it provides session control for the registered users' sessions;
- it handles SIP requests, and either services these internally or forwards them on to a further node; and
- it interacts with IMS Application Servers.

The S-CSCF performs SIP routing according to 3GPP routing procedures. For inbound SIP traffic, the S-CSCF will route sessions to that P-CSCF whose address was stored during subscriber registration. For outbound SIP traffic, the S-CSCF interrogates a DNS/ENUM to determine how the call should be routed. The S-CSCF interacts with the Home Subscriber Server (HSS) to obtain subscriber data and to exchange authentication information using DIAMETER messages.

The IMS allows IMS subscribers to initiate sessions with non-IMS users, including users connected to conventional telephone networks. IMS subscribers may also be allocated addresses such as telephone numbers to allow for incoming calls to be made to these subscribers via external networks. This results in increased usage of new multimedia services and therefore higher revenues for operators.

Each UE in an IMS may preferentially use specific Application Servers for executing originating services, terminating services or any other services required in a communication or call session. These preferences are linked to each UE and stored in an Initial Filter Criteria (iFCs) located in the HSS of a user's home network. A user's iFCs are downloaded to the S-CSCF upon registration of the user with the S-CSCF, or upon receiving a particular service demand.

Whenever a user A sends an SIP request, such as an SIP INVITE signal, to the S-CSCF, indicating that it would like to enter a communication session with user agent B, the S-CSCF checks user agent's iFC to determine which Application Server should execute outgoing services for A.

Similarly, user B may always use a particular Application Server to execute terminating services. In particular, an iFC for user B may specify that two distinct Application Servers are to be used for terminating services handled for B, and originating services handled for B, respectively.

In case user B wishes to divert or forward a call it received, two distinct Application Servers may therefore be involved: a first Application Server handling terminating services for a first communication leg terminating at B, and a second Application Server handling originating services for the new communication leg originating at B, and terminating at the new target.

An ISM may also take advantage of legacy services that are available in a network operator's infrastructure. An example of such legacy services are Customized Applications For Mobile Enhanced Logic (CAMEL) services.

In the context of mobile telecommunications networks of the second generation (2G), such as GSM networks, Intelligent Networks (IN) were developed to provide additional, more flexible supplementary subscriber services. Supplementary subscriber services may be divided into two types: firstly, those, which modify or supplement the process of originating a call and secondly, those, which modify or supplement the process of terminating a call. An example of originating supplementary services is the barring of outgoing calls. Examples of terminating supplementary services include barring incoming calls, call forwarding, and call waiting.

The usage of standardised IN elements, which accomplish the deployment of IN services, is specified in the Customized Applications For Mobile Enhanced Logic, (CAMEL) standard. The CAMEL standard forms part of the GSM Network (ETSI) and the 3rd Generation Partnership Project (3GPP) specifications. CAMEL service triggers are defined and accessible by the Mobile Switching Center (MSC) in a GSM network. For example, when the MSC receives a call diversion request from a user and a corresponding CAMEL trigger is defined for the diverting user, the MSC contacts a CAMEL service using a CAMEL Application Part (CAP) request. The CAMEL service then provides the appropriate service for the call, such as call forwarding or diversion, for example.

If a user has subscribed to a CAMEL service, this information will be reflected in a CAMEL Subscription Information (CSI), which is generally stored in the user's HSS. The CSI is retrieved by the CAMEL service when it handles a CAMEL request. As CAMEL services are available for both originating and terminating services, separate profiles for originating (O-CSI) and terminating (T-CSI) may be available for a given user.

In the case of a call diversion or forwarding, the O-CSI of the diverting or forwarding user may also include information on whether CAMEL services should be invoked on the new communication leg, which will link the diverting user to the new target.

In GSM networks, this information is made available to the MSC. As a user will use the same MSC for both terminating and originating services, that MSC will know whether CAMEL services should or should not be invoked on the new communication leg, and it will set up the leg accordingly.

CAMEL services have been implemented by many operators for use in their GSM networks, often involving significant costs. Many operators still use these services in conjunction with their ISM network infrastructure.

For example, in case user B in an ISM network wishes to divert or forward a call it received to a new target, the first Application Server handling terminating services for the first communication leg terminating at B may send a CAP request to a CAMEL service. The CAMEL service will retrieve O-CSI information for at least one of the subscribers involved in the diversion request and send it in a CAP reply to the first Application Server. This O-CSI information may include information as to whether CAMEL services should be used on the new communication leg, or not.

The originating services for user B may be executed by a second Application Server in charge of establishing the new communication leg. However, the O-CSI information that has been retrieved by the first Application Server is not available at the second Application Server. The second Application Server therefore sends a new CAP request to the CAMEL service, which will retrieve the O-CSI information once more. This results in a particular waste of network resources and time if the O-CSI information retrieved by the first Application Service indicated that CAMEL service should not be invoked on the new communication leg.

An example would be if B is provisioned with an originating service such as Number Portability in CAMEL. Number Portability enables a subscriber of a telecommunication provider to port the subscribed service to another telecommunication provider in that country, but retain the telephone number.

A CAMEL service implementation invoked by the first Application Server, handling terminating services for B, would check if the called party number is a ported number. Then there should be no need to check the called party number for Number Portability once again at the second Application Server, which handles originating services for B. In existing IMS architectures using CAMEL services, the second Application Server would however check the called party number for Number Portability one more time, as the corresponding information is not available to it.

According to existing and currently proposed IMS architectures, there is no easy way to configure an Application Server, CAMEL service or CSCF so as to address this unwanted behaviour.

SUMMARY

According to a first aspect of the present invention, there is provided a method for establishing a new communication leg of a communication session in an IP Multimedia Subsystem, IMS, network. The method comprises handling, at a first node, which executes terminating services for a user, a Session Initiation Protocol, SIP, request. The SIP request comprises instructions to set up said new communication leg originating at said user, and has been sent from a Call Session Control Function node, CSCF, to which said user has been allocated. The method then comprises, at said first node, retrieving information relating to said user from a data store. This is achieved by using a Customized Applications for Mobile Network Enhanced Logic, CAMEL, service. The method then comprises transmitting a portion of information, which comprises at least part of said retrieved information, from said first node to said CSCF node. In said CSCF node, said portion of information is then added to SIP requests originating from said CSCF node and relating to the establishment of the new communication leg. The method further comprises handling, at a second node that executes originating services for said user, an SIP request sent from said CSCF node. This request comprises instructions to set up the new communication leg and also comprises said portion of information. The method then comprises, at said second node, using a CAMEL service for establishing said new communication leg, conditional on a contents of said portion of information.

According to a second aspect of the present invention, a method for handling information retrieved from a CAMEL service at a first IMS network node is provided. The method comprises transmitting a portion of information, said portion comprising at least part of said retrieved information, from said first node to a CSCF node.

According to a third aspect of the present invention, a method for handling a portion of information received from a first IMS network node at a CSCF node is provided. Said portion of information comprises information retrieved from a CAMEL service. The method comprises adding, in said CSCF node, said portion of information to at least one outgoing SIP request.

Said portion of information may preferably be transmitted from said first node to said CSCF by sending an SIP request to said CSCF.

Preferably, said portion of information may be added into said SIP requests at the respective nodes by adding it in an SIP header. Alternatively, said portion of information may be added into said SIP requests by adding it in a parameter value of the SIP requests.

According to a fourth aspect of the present invention, a method for handling an SIP request at a second IMS network node is provided. The SIP request comprises instructions to set up a new communication leg and a portion of information. The portion of information comprises information retrieved from a CAMEL service. The method comprises reading said portion of information, evaluating said portion of information and selectively using a CAMEL service for establishing said new communication leg, conditional on a contents of said portion of information.

Preferably, said portion of information retrieved from said CAMEL service, which is transmitted by said first node to said CSCF node, handled and forwarded by said CSCF node, and received and evaluated by said second node, may comprise an Originating CAMEL Subscription Information, O-CSI, applicable flag.

Preferably, said second IMS node may use a CAMEL service only if said portion of information comprises a raised Originating CAMEL Subscription Identifier, O-CSI, applicable flag.

Said CSCF may preferably be a Serving CSCF, S-CSCF.

According to a fifth aspect of the present invention, there is provided an apparatus comprising a first node configured to execute terminating services for a user within an IP Multimedia Subsystem, IMS, network. The apparatus comprises a first receiving unit for receiving SIP requests, a second receiving unit for receiving CAMEL Application Part, CAP, packets, a first transmission unit for sending SIP requests, a second transmission unit for sending CAP packets, and a processing unit configured to read a portion of information, comprising at least part of the information included in a received CAP packet, and to add said portion of information into at least one outgoing SIP request.

Preferably, the processing unit of said apparatus may be configured to add said portion of information into said SIP request by including it in an SIP header. Alternatively, the processing unit may be configured to add said portion of information into said SIP request by including it in a parameter value of the SIP request.

More preferably, said portion of information may comprise an Originating CAMEL Subscription Information, O-CSI, applicable flag.

According to a sixth aspect of the present invention, there is provided an apparatus configured to operate as a Call Session Control Function, CSCF, within an IP Multimedia Subsystem, IMS, network. The apparatus comprises at least one receiving unit for receiving SIP requests from an upstream node, at least one transmission unit for transmitting SIP requests to a downstream node, and a processing unit configured to read a portion of information included in a received SIP request, which was retrieved from a CAMEL service by an upstream node, and to add said portion of information to at least one outgoing SIP request.

Preferably, the processing unit of said apparatus may be configured to add said portion of information into said SIP requests by including it in an SIP header. Alternatively, said processing unit may be configured to add said portion of information into said SIP requests by including it in a parameter value of the SIP request.

Said portion of information, added by said apparatus, may preferably comprise an Originating CAMEL Subscription Information, O-CSI, applicable flag.

Said apparatus may preferably be configured to operate as a Serving CSCF, S-CSCF.

According to a seventh aspect of the present invention, there is provided an apparatus comprising a second node configured to execute originating services for a user within an IP Multimedia Subsystem, IMS, network. The apparatus comprises a first receiving unit for receiving SIP requests, a second receiving unit for receiving CAMEL Application Part, CAP, packets, a first transmission unit for sending SIP requests, a second transmission unit for sending CAP packets, and a processing unit configured to read a portion of information included in a received SIP request, which was retrieved from a CAMEL service by an upstream node, and to selectively contact a CAMEL service to retrieve information relating to a user, conditional on a contents of the read portion of information.

The processing unit of said apparatus may preferably be configured to contact a CAMEL service only if said read portion of information comprises a raised Originating CAMEL Subscription Identifier, O-CSI, applicable flag.

BRIEF DESCRIPTION OF THE DRAWINGS

Aspects of the present invention will now be further described, by way of example only, with reference to the accompanying figures.

DETAILED DESCRIPTION

As described above, while using a legacy CAMEL service in IMS network architectures, there is a need for using the information provided by the CAMEL service more efficiently. Currently, information retrieved by one Application Server is not passed on to further IMS nodes, such as CSCF's, other Application Servers or User Equipment. This problem is addressed by including at least part of the information that is received by a first requesting Application Server or IMS node from a CAMEL service, in packets transmitted to nodes that are located downstream of the first Application Server or IMS node. A second Application Server or IMS node receiving such packets will be made aware of the information retrieved from the CAMEL service, and may decide whether it needs to contact said service or not.

Figure 1:
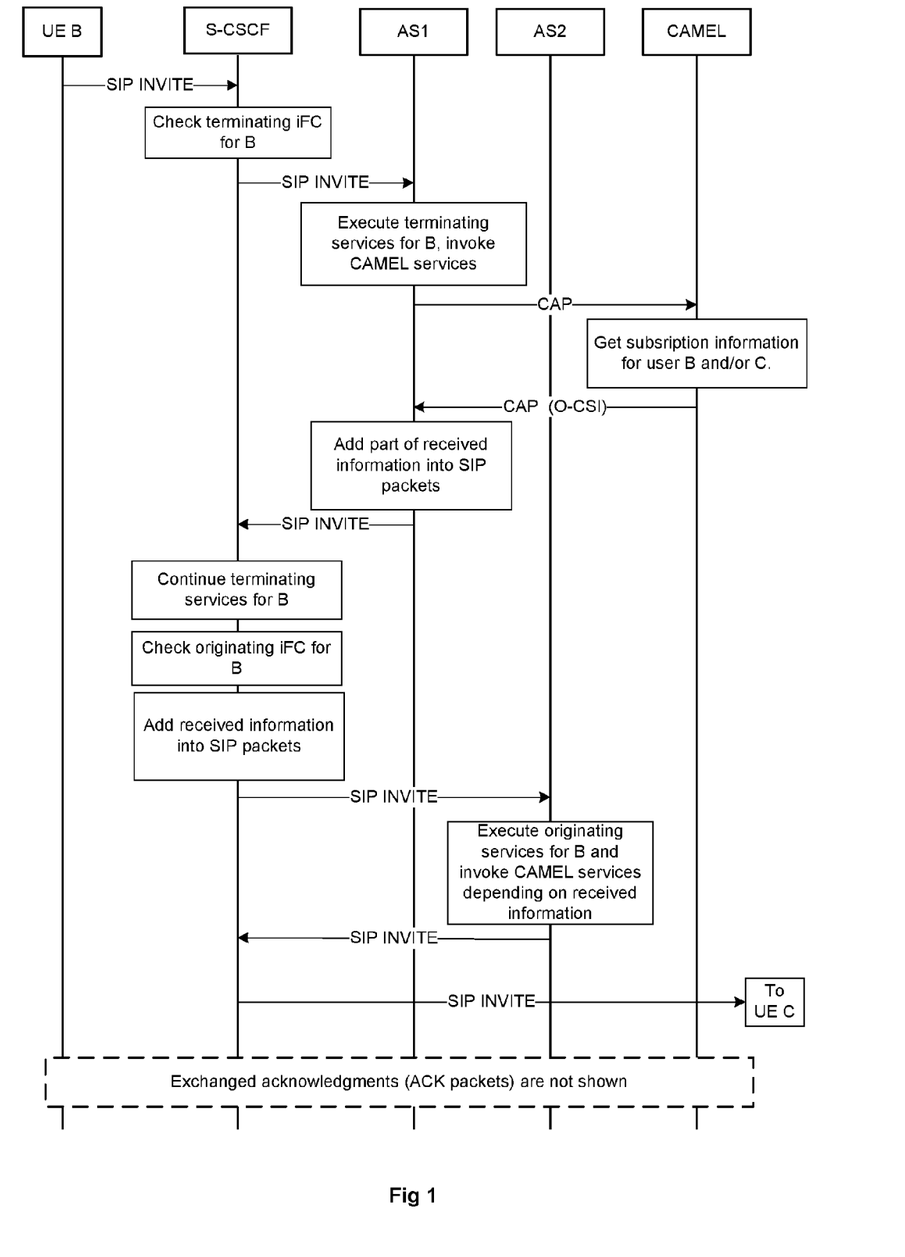
FIG. 1 shows signalling associated with the handling of a diversion request in an IMS network architecture.

The sequence of events for handling a forwarding or diversion request of an IMS communication ending at UE of subscriber B in accordance with the present invention is illustrated in FIG. 1.

UE B initiates a diversion of a call to UE C by sending a corresponding SIP request, such as an SIP INVITE message, to the S-CSCF to which it has been allocated. The S-CSCF checks the iFC for subscriber B in order to determine the Application Server that needs to be used for handling UE B's terminating services. It finds Application Server AS1 and forwards a corresponding SIP request to it. AS1 executes terminating services for B and uses CAMEL services for the call diversion. A corresponding CAP request is sent to the CAMEL services. The CAMEL services retrieve the O-CSI for user B and/or C from a database and forward it in at least one CAP packet to AS1. In known architectures, the information retrieved by the CAMEL services stays at AS1. According to the present invention, AS1 is configured to include at least part of the received information in an SIP request it sends back to the S-CSCF. In this embodiment, the information that is forwarded includes the 'O-CSI applicable' flag. If this flag is raised in the O-CSI information, this means that the CAMEL services have determined that the new communication leg to the new target should invoke CAMEL services. If the flag is not raised, CAMEL service invocation should be suppressed for the new communication leg. Different ways of including the information into the SIP packets are discussed below.

The S-CSCF may continue the execution of terminating services for UE B, and checks UE B's iFC for originating services. The S-CSCF determines that Application Server AS2 handles UE B's originating services. It sends a corresponding SIP request to AS2, by including the information it has received from AS1, which in turn was retrieved by the CAMEL service, into the new SIP request. By doing so, the S-CSCF is capable of synchronizing the state of the call-deferring signalling between AS1 and AS2.

Application Server AS2 executes originating services for B and invokes CAMEL services conditional upon the information that was included in the SIP request it received from the S-CSCF. In this embodiment, this information includes the 'O-CSI applicable' flag. If AS2 reads that the 'O-CSI applicable' flag has been set at an upstream node, it concludes that CAMEL services should be invoked for the new communication leg. If the 'O-CSI applicable' flag is not set, AS2 concludes that the invocation of the CAMEL services should be suppressed on the new communication leg, and does so by not contacting the CAMEL services again.

In the subsequent steps, the new communication leg is established between UE B and the new target, UE C, in accordance with methods known to the skilled person.

In one embodiment, the 'O-CSI applicable' flag is inserted by Application Server AS1 by adding a private header (P-header) to the outgoing SIP request. Private P-headers are allowable in this case as the information added will not cross IMS network boundaries.

The syntax of a P-header for the information that is to be transmitted can, for example, be defined as follows, wherein EQUAL, HCOLON, SEMI, name-addr, addr-spec, and generic-param are defined in RFC 3261. The syntax is constructed in accordance with RFC 5234:

| P-Service-Info | = | P-Service-Info" HCOLON PServiceInfo-value *(SEMI service-info-param) |
|---|---|---|
| service-info-param | = | ocsiapplicable-param / generic-param |
| PServiceInfo-value | = | name-addr / addr-spec |
| ocsiapplicable-param | = | "ocsiapplicable" EQUAL "true" / "false" |

The following is an example of a P-Service-Info header field, in which the transmitted information indicates that the O-CSI applicable flag is true for user B. This means that CAMEL services should be invoked on the new communication leg that is to be established, and which originates at B:

P-Service-Info:     <sip:userB@example.com>; ocsiapplicable=true In a different embodiment, the 'O-CSI applicable' flag is inserted by Application Server AS1 by adding it as a parameter value to the outgoing SIP request. An example of a parameter suitable for carrying the information is the generic-param in the P-Served-User header. RFC 5502 defines the SIP P-Servers-User Private-Header (P-Header) for the 3GPP IP Multimedia (IM) Core Network (CN) Subsystem.

Figure 2:
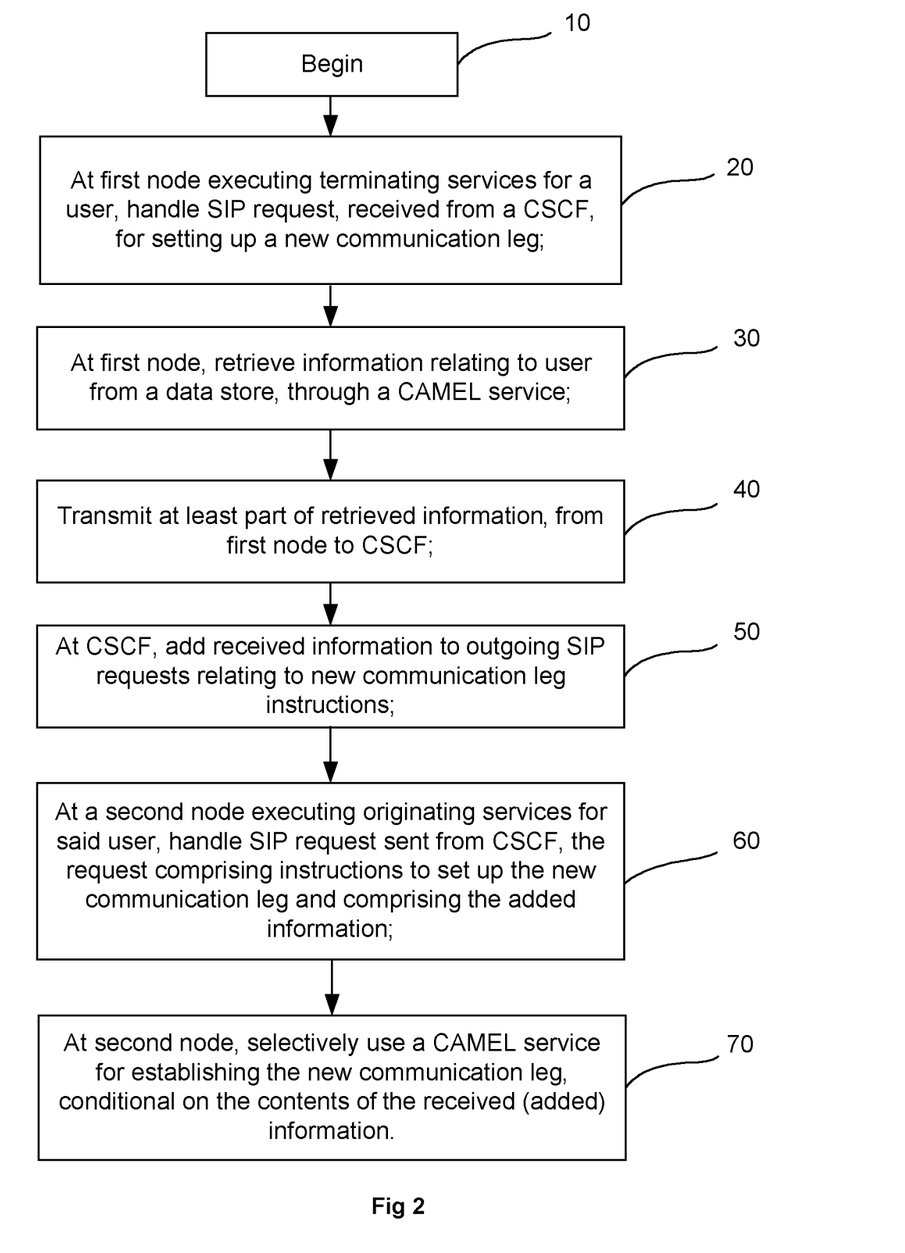
FIG. 2 is a flow diagram illustrating high level steps associated with a method according to an embodiment of the present invention.

The following is an example of a P-Served-User header field when a generic-param is used as the transport mechanism. Here, the transmitted information indicates that the O-CSI applicable flag is set to the value 'true' for user B. This means that CAMEL services should be invoked on the new communication leg that is to be established, and which originates at B:

P-Served-User:     <sip:userB@example.com>; ocsiapplicable=true FIG. 2 illustrates the main steps of the method according to the present invention in a flowchart. The method starts at Step 10. At Step 20, a first node, such as an Application Server, corresponding to AS1 in FIG. 1 and executing terminating services for the diverting user, handles an SIP request received from the diverting user via it's S-CSCF. The request comprises instructions for setting up a new communication leg. At Step 30, said first node retrieves information relating to at least one of the users involved in the call diversion. This information is retrieved by using a CAMEL service, and comprises subscriber information. At Step 40, said first node transmits a portion of the retrieved information to the S-CSCF. In a preferred embodiment, the transmitted portion comprises the 'O-CSI applicable' flag and its value, as provided by the CAMEL service. At Step 50, the portion of information is included in outgoing SIP requests relating to the establishment of the new communication leg. At Step 60, a second node, such as a second Application Server, corresponding to AS2 in FIG. 1 and executing originating services for the diverting user, handles a SIP request received from the S-CSCF. The request comprises instructions for setting up the new communication leg, and the portion of information added by the S-CSCF, which the S-CSCF has received from the first Application Server, and which was retrieved by using the CAMEL service. At Step 70, said second node selectively invokes a CAMEL service for establishing the new communication leg, conditional on the contents of said received portion of information.

Figure 3:
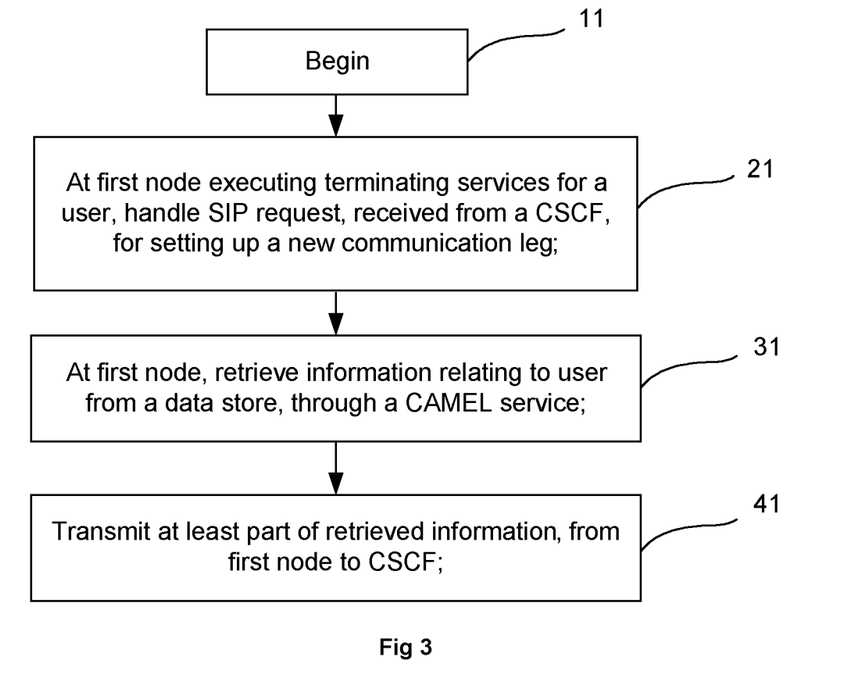
FIG. 3 is a flow diagram illustrating high level steps associated with a method according to an embodiment of the present invention.

FIG. 3 illustrates the main steps of the method implemented in one embodiment by a first IMS node, such as an Application Server corresponding to AS1 in FIG. 1 and executing terminating services for the diverting user. The method starts at Step 11. At Step 21, the first node handles an SIP request received from the diverting user via it's S-CSCF. The request comprises instructions for setting up a new communication leg. At Step 31, said first node retrieves information relating to at least one of the users involved in the call diversion. This information is retrieved by using a CAMEL service, and comprises subscriber information. At Step 41, said first node transmits a portion of the retrieved information to the S-CSCF. In a preferred embodiment, the transmitted portion comprises the 'O-CSI applicable' flag and its value, as provided by the CAMEL service.

Figure 4:
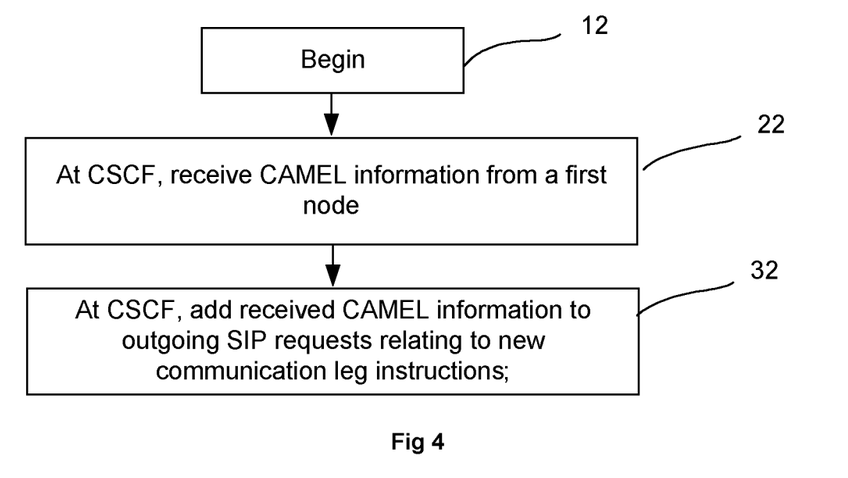
FIG. 4 is a flow diagram illustrating high level steps associated with a method according to an embodiment of the present invention.

FIG. 4 illustrates the main steps of the method implemented in one embodiment by an IMS node, such as an S-CSCF. The method starts at Step 12. At Step 22, the portion of information transmitted by said first node is received and handled by the S-CSCF. At Step 32, the portion of information is added to outgoing SIP requests relating to the establishment of the new communication leg.

Figure 5:
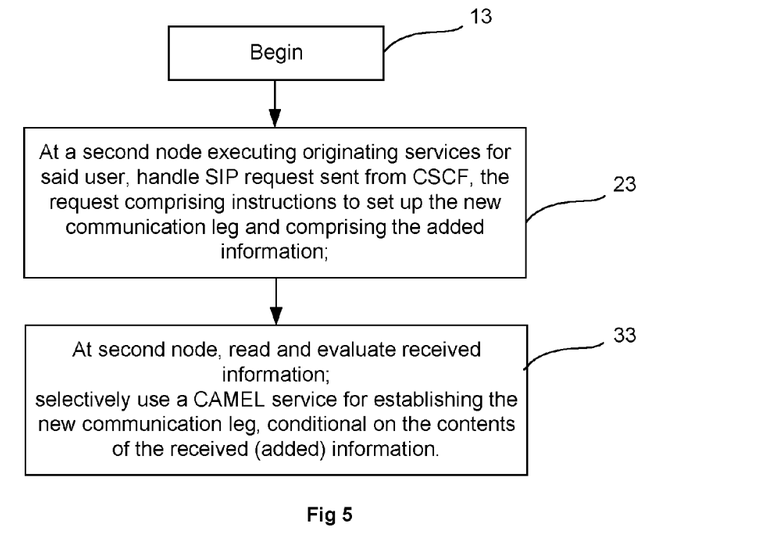
FIG. 5 is a flow diagram illustrating high level steps associated with a method according to an embodiment of the present invention.

FIG. 5 illustrates the main steps of the method implemented in one embodiment by a second IMS node, such as an Application Server corresponding to AS2 in FIG. 1 and executing originating services for the diverting user. The method starts at Step 13. At Step 23, said second node handles a SIP request received from the S-CSCF. The request comprises instructions for setting up the new communication leg, and the portion of information added by the S-CSCF, which the S-CSCF has received from the first Application Server, and which was retrieved by using the CAMEL service. At Step 33, said second node reads and evaluates the portion of information, and selectively invokes a CAMEL service for establishing the new communication leg, conditional on the contents of said received portion of information.

Figure 6:
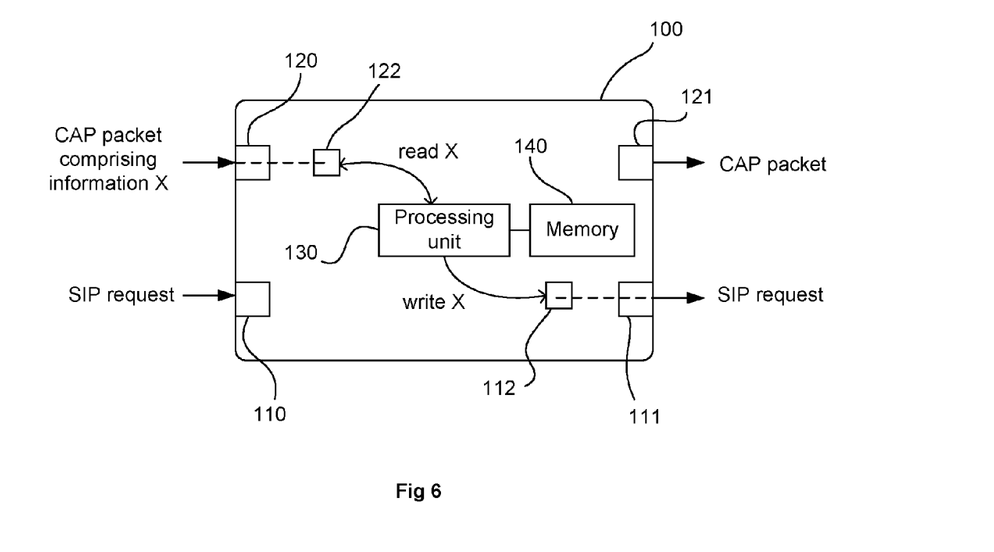
FIG. 6 illustrates schematically an embodiment of an apparatus implementing an Application Server.

FIG. 6 schematically illustrates an embodiment of an IMS node 100 according the present invention. The node is configured to execute terminating services for a user in an IP Multimedia Subsystem (IMS) network. This provides the functionality of AS1 in FIG. 1. The node 100 comprises at least a first receiving unit 110 for receiving SIP packets from an S-CSCF, and a first sending unit 111 for sending SIP packets to an S-CSCF. The node 100 further comprises at least a second receiving unit 120 for receiving CAP packets from a CAMEL service, and a second sending unit 121 for sending CAP packets to a CAMEL service. The node 100 further comprises a processing unit 130 and a memory 140, wherein the processing unit is configured to read a portion of information from a CAP packet 122 that has been received by said CAP receiving unit 120, and to write said information into at least one outgoing SIP packet 112, that will be sent using said SIP transmission unit 111.

Figure 7:
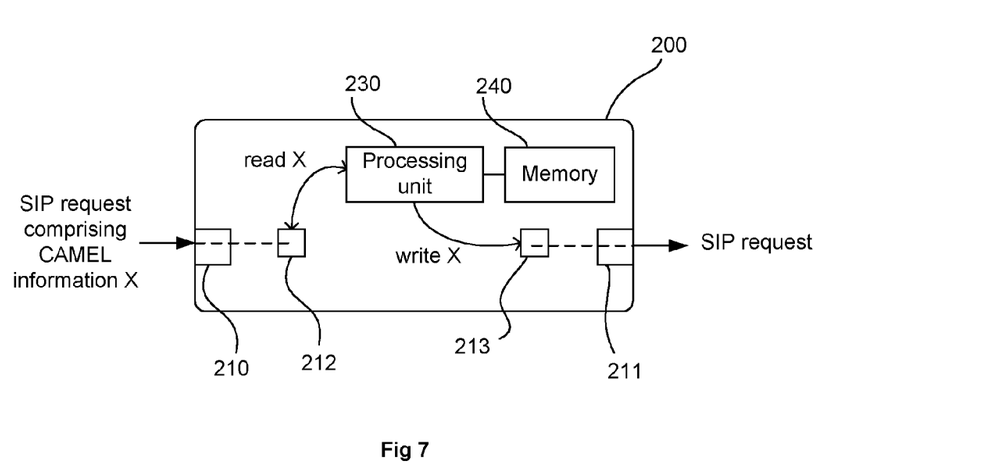
FIG. 7 illustrates schematically an embodiment of an apparatus implementing a CSCF.

FIG. 7 schematically illustrates an IMS node 200 according to an embodiment of the present invention. The node is configured to execute a Call Session Control Function, (CSCF), service for a user in an IP Multimedia Subsystem (IMS) network. It provides the functionality of the S-CSCF in FIG. 1. The node 200 comprises at least one receiving unit 210 for receiving SIP packets from an Application Server or a User Equipment, and a sending unit 211 for sending SIP packets to an Application Server or a User Equipment. The node 200 further comprises a processing unit 230 and a memory 240, wherein the processing unit is configured to read a portion of information from a SIP packet 212 that has been received by said SIP receiving unit 210, and to write said portion of information into at least one outgoing SIP packet 213, that will be sent using said SIP transmission unit 211.

Figure 8:
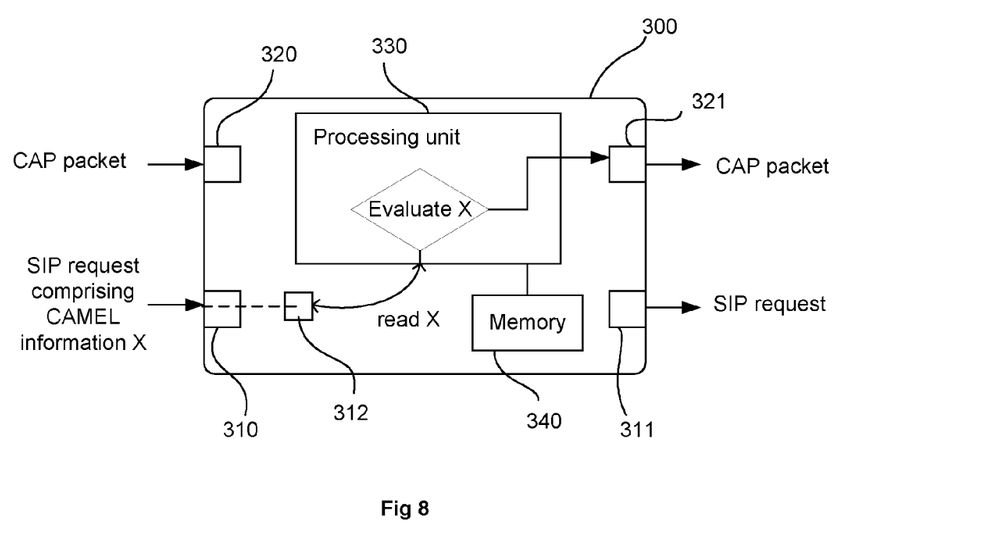
FIG. 8 illustrates schematically an embodiment of an apparatus implementing a second Application Server.

FIG. 8 schematically illustrates an embodiment of an IMS node 300 according to the present invention. The node is configured to execute originating services for a user in an IP Multimedia Subsystem (IMS) network. It provides the functionality of AS2 in FIG. 1. The node 300 comprises at least a first receiving unit 310 for receiving SIP packets from an S-CSCF, and a first sending unit 311 for sending SIP packets to an S-CSCF. The node 300 further comprises at least a second receiving unit 320 for receiving CAP packets from a CAMEL service, and a second sending unit 321 for sending CAP packets to a CAMEL service. The node 300 further comprises a processing unit 330 and a memory 340, wherein the processing unit is configured to read a portion of information from a SIP packet 312 that has been received by said SIP receiving unit 310, and to evaluate the contents of said portion of information. The processing unit is further configured to selectively send a CAP packet using said CAP transmission unit 321, depending on the contents of the evaluated portion of information.

Memories 140, 240, 340 store instructions for processing by the respective processing units 130, 230, 330. Each node 100, 200, 300 may be considered as a computer configured to act as described by processing the corresponding stored instructions.

It will be appreciated by the person skilled in the art that various modifications may be made to the above described embodiments without departing from the scope of the present invention.

The invention claimed is:

1. A method for establishing a new communication leg of a communication session in an IP Multimedia Subsystem (IMS) network, the method comprising:

handling, at a first node executing terminating services for a user, a Session Initiation Protocol (SIP) request comprising instructions to set up said new communication leg originating at said user, said request being sent from a Call Session Control Function (CSCF) node to which said user has been allocated;

said first node retrieving information relating to the terminating services and said establishment of said new communication leg from a data store by using a Customized Applications for Mobile Network Enhanced Logic (CAMEL) service;

transmitting, a portion of said retrieved information, from said first node to said CSCF node, wherein said portion of information includes an indication as to whether the CAMEL service is to be invoked for originating services to set up said new communication leg;

adding, in said CSCF node, said portion of information to at least one SIP request originating from said CSCF node and relating to said communication session;

handling, at a second node executing the originating services for said user, an SIP request sent from said CSCF node, said request comprising instructions to set up the new communication leg and comprising said portion of information including the indication; and said second node selectively using the CAMEL service for establishing said new communication leg, based on the indication as to whether the CAMEL service is to be invoked at the second node.

2. A method according to claim 1, wherein said first node transmits said portion of information by adding it to an SIP request sent to said CSCF node.

3. A method according to claim 1, wherein said portion of information is added to said at least one SIP request by adding it in a parameter value of said at least one SIP request.

4. A method according to claim 1, wherein said portion of information is added as an SIP header of said at least one SIP request.

5. A method according to claim 1, wherein said CSCF is a Serving CSCF (S-CSCF).

6. A method according to claim 1, wherein the indication is an Originating CAMEL Subscription Information (O-CSI) applicable flag.

7. An apparatus comprising an application server at a first node configured to execute terminating services for a user within an IP Multimedia Subsystem (IMS) network, comprising:

a first receiving unit of the application server configured to receive Session Initiation Protocol (SIP) requests comprising instructions to set up a new communication leg of a communication session;

a second receiving unit of the application server configured to receive information relating to the terminating services and establishment of the new communication leg by receiving Customized Applications for Mobile Network Enhanced Logic (CAMEL) Application Part (CAP) packets from a CAMEL service;

a processing unit of the application server coupled to the first receiving unit and the second receiving unit and configured to process the information and add a portion of information into at least one outgoing SIP request, wherein the portion of information includes an indication as to whether the CAMEL service is to be invoked for originating services to be set up by an originating services node for the new communication leg; and at least one transmission unit coupled to the processing unit to transmit the at least one outgoing SIP request.

8. The apparatus according to claim 7, wherein said processing unit is configured to add said portion of information into said at least one outgoing SIP request by including it in a parameter value of said at least one outgoing SIP request.

9. The apparatus according to claim 7, wherein said processing unit is configured to add said portion of information into said at least one outgoing SIP request by including it in a header of said at least one outgoing SIP request.

10. The apparatus according to claim 7, wherein the indication is an Originating CAMEL Subscription Information (O-CSI) applicable flag.

11. The apparatus according to claim 7, wherein said apparatus is configured to operate as a terminating services application server.

12. An apparatus configured to operate as a Call Session Control Function (CSCF) within an IP Multimedia Subsystem (IMS) network, the apparatus comprising:
 at least one receiving unit configured to receive incoming Session Initiation Protocol (SIP) requests from an upstream node that handles terminating services for a user;
 at least one transmission unit configured to transmit outgoing SIP requests to a downstream node that handles originating services for the user, wherein the upstream node retrieves information relating to the terminating services and establishment of a new communication leg h using a Customized Applications for Mobile Network Enhanced Look (CAMEL) service and sends a portion of the information that includes an indication as to whether the CAMEL service is to be invoked for use by the originating services to set up the new communication leg by the downstream node; and
 a processing unit, coupled to the at least one receiving unit and the at least one transmission unit, configured to process the portion of the information including the indication from the upstream node, and to add said portion of information to at least one outgoing SIP request that is to be sent h the at least one transmission unit to the downstream node to handle the originating services for the user.

13. The apparatus according to claim 12, wherein said processing unit is configured to add said portion of information into said at least one outgoing SIP request by including it in a parameter value of said at least one outgoing SIP request.

14. The apparatus according to claim 12, wherein said processing unit is configured to add said portion of information into said at least one outgoing SIP request by including it in a header of said at least one outgoing SIP request.

15. The apparatus according to claim 12, wherein the indication is an Originating CAMEL Subscription Information (O-CSI) applicable flag.

16. The apparatus according to claim 12, wherein said apparatus is configured to operate as a Serving CSCF (S-CSCF).

17. An apparatus comprising an application server at a second node configured to execute originating services for a user within an IP Multimedia Subsystem (IMS) network, comprising:
 a first receiving unit of the application server configured to receive Session Initiation Protocol (SIP) requests comprising instructions to set up a new communication leg of a communication session;
 a second receiving unit configured to receive Customized Applications for Mobile Network Enhanced Logic (CAMEL) Application Part (CAP) packets from a Call Session Control Function (CSCF);
 a processing unit coupled to the first receiving unit and the second receiving unit and configured to process a portion of information included in a received SIP request, wherein the portion of information includes an indication as to whether to invoke a connection to a CAMEL service to retrieve information relating to a user to set up the originating services, the indication being generated by a first node operating as a terminating services node for the user and in which the first node had already determined whether the CAMEL service is utilized for the communication session; and
 at least one transmission unit coupled to the processing unit to transmit at least one outgoing SIP request.

18. The apparatus according to claim 17, wherein the indication is an Originating CAMEL Subscription Identifier (O-CSI) applicable flag.

* * * * *